US008965961B1

(12) United States Patent
Roskind et al.

(10) Patent No.: US 8,965,961 B1
(45) Date of Patent: *Feb. 24, 2015

(54) SYSTEM AND METHOD OF REDUCING LATENCY USING ADAPTIVE RETRANSMISSION TIMEOUTS

(71) Applicant: Google Inc., Mountain View, CA (US)

(72) Inventors: James Roskind, Redwood City, CA (US); Michael A. Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/903,372

(22) Filed: May 28, 2013

Related U.S. Application Data

(63) Continuation of application No. 12/783,797, filed on May 20, 2010, now Pat. No. 8,468,196.

(51) Int. Cl.
*G06F 15/16* (2006.01)
*H04L 12/26* (2006.01)

(52) U.S. Cl.
CPC ..................... *H04L 43/08* (2013.01)
USPC ........................................ 709/203

(58) Field of Classification Search
USPC .................................. 709/203, 224
See application file for complete search history.

(56) References Cited

U.S. PATENT DOCUMENTS

| | | | |
|---|---|---|---|
| 5,961,605 A | 10/1999 | Deng et al. | |
| 6,205,120 B1 | 3/2001 | Packer et al. | |
| 6,215,769 B1 | 4/2001 | Ghani et al. | |
| 6,219,713 B1 | 4/2001 | Ruutu et al. | |
| 6,252,851 B1 | 6/2001 | Siu et al. | |
| 6,341,129 B1 | 1/2002 | Schroeder et al. | |
| 6,446,121 B1 | 9/2002 | Shah et al. | |
| 6,646,987 B1 | 11/2003 | Qaddoura | |
| 6,788,704 B1 | 9/2004 | Lindsay | |
| 6,922,724 B1 | 7/2005 | Freeman et al. | |
| 6,925,060 B2 | 8/2005 | Mangin | |
| 6,958,997 B1 | 10/2005 | Bolton | |
| 7,142,536 B1 | 11/2006 | Gossett et al. | |
| 7,174,386 B2 | 2/2007 | Cunningham et al. | |
| 7,225,266 B2 | 5/2007 | Ameigeiras et al. | |
| 7,443,811 B2 | 10/2008 | Sturrock et al. | |
| 2002/0112057 A1 | 8/2002 | Srinivas et al. | |
| 2004/0128346 A1 | 7/2004 | Melamed et al. | |
| 2008/0075000 A1 | 3/2008 | Robbins | |
| 2008/0089230 A1 | 4/2008 | Kootstra | |

OTHER PUBLICATIONS

Paxson et al., RFC 2581—TCP Congestion Control, http://www.opalsoft.net/qos/TCP-1010.htm (2009).
Huston, TCP—How it works, The ISP column (2004).

*Primary Examiner* — Adnan Mirza
(74) *Attorney, Agent, or Firm* — Lerner, David, Littenberg, Krumholz & Mentlik, LLP

(57) ABSTRACT

In one aspect, a system and method are provided whereby latency in network communication protocols such as the TCP/IP suite of protocols is reduced by transmitting a new and second connection request from a sending device to a receiving device over a network based upon adaptively determined dynamic initial timeout values, where the dynamic initial timeout values are adaptively determined based upon data associated with one or more historical requests transmitted over the network by the sending device.

20 Claims, 8 Drawing Sheets

SYSTEM AND METHOD OF REDUCING LATENCY USING ADAPTIVE RETRANSMISSION TIMEOUTS

CROSS-REFERENCE TO RELATED APPLICATIONS

This application is a continuation of U.S. application Ser. No. 12/783,797, filed on May 20, 2010, the disclosure of which is incorporated herein by reference.

BACKGROUND OF THE INVENTION

Network communication protocols such as the TCP/IP suite of protocols are well known and widely used for servicing connection oriented data transmissions between two devices communicating information over a network such as the Internet.

While certain protocols such as the TCP protocol provide mechanisms for reliable delivery of data between a sending device and a receiving device, data packets containing information can still get lost or dropped in a congested network.

Typically, conventional implementations of network protocols such as the TCP/IP suite of internet protocols maintain retransmission timers that are initially set to a static fixed value and used to determine whether a pending request for information transmitted over the network has been lost and must be retransmitted. For example, if a connection request or a domain name resolution request is transmitted from a sending device to a receiving device in accordance with one or more appropriate networking protocols and a response is not received prior to the expiry of a retransmission timer that is initially set to a static fixed value, the sending device will typically determine that the pending and active request was lost in transit and retransmit the same original request. While the use of retransmission timers that are initially set to a static fixed value is useful in some data transmissions using conventional network protocols, it can increase the latency measured from a user's perspective in certain situations.

SUMMARY OF THE INVENTION

In one aspect, a method of transmitting packets over a network is provided. The method includes adaptively determining a dynamic initial timeout value with a processor, where the dynamic initial timeout value is based on a time within which one or more responses were received at a first device over a network to one or more historical requests; transmitting a first request for first information from the first device to a second device over the network; before a response is received from the second device to the first request, comparing the time that has elapsed since the first request was transmitted with the adaptively determined dynamic initial timeout value; and, transmitting, depending on the comparison and via the network, a new request for the first information to the second device, where the new request is distinct from and unrelated to the first request.

In another aspect, a system is provided that includes memory storing instructions and data, and a processor to execute the instructions and to process the data. The data includes a first request for first information to be transmitted over a network to a second device, and the instructions include: adaptively determining a dynamic initial timeout value with the processor, where the dynamic initial timeout value is based on a time within which one or more responses were received at a first device over a network to one or more historical requests; transmitting the first request for the first information from the first device to the second device over the network; before a response is received from the second device to the first request, comparing the time that has elapsed since the first request was transmitted with the adaptively determined dynamic initial timeout value; and, transmitting, depending on the comparison and via the network, a new request for the first information to the second device, where the new request is distinct from and unrelated to the first request.

BRIEF DESCRIPTION OF THE DRAWINGS

Other objects and advantages of the present invention will be apparent from the following detailed description of the present preferred embodiments, which description should be considered in conjunction with the accompanying drawings in which like reference indicate similar elements and in which.

DETAILED DESCRIPTION

In one aspect, a system and method is provided whereby latency in network communication protocols such as the TCP/IP protocol suite is reduced by transmitting a brand new connection request (e.g., a SYN packet) that is distinct from and unrelated to any other pending and open request over a network from the sending device (such as a client device) to the receiving device (such as a server) using adaptively determined dynamic initial timeout values i.e., timeout values that are dynamically selected based upon data associated with historical connection requests (i.e., non-pending, closed requests).

Figure 1:
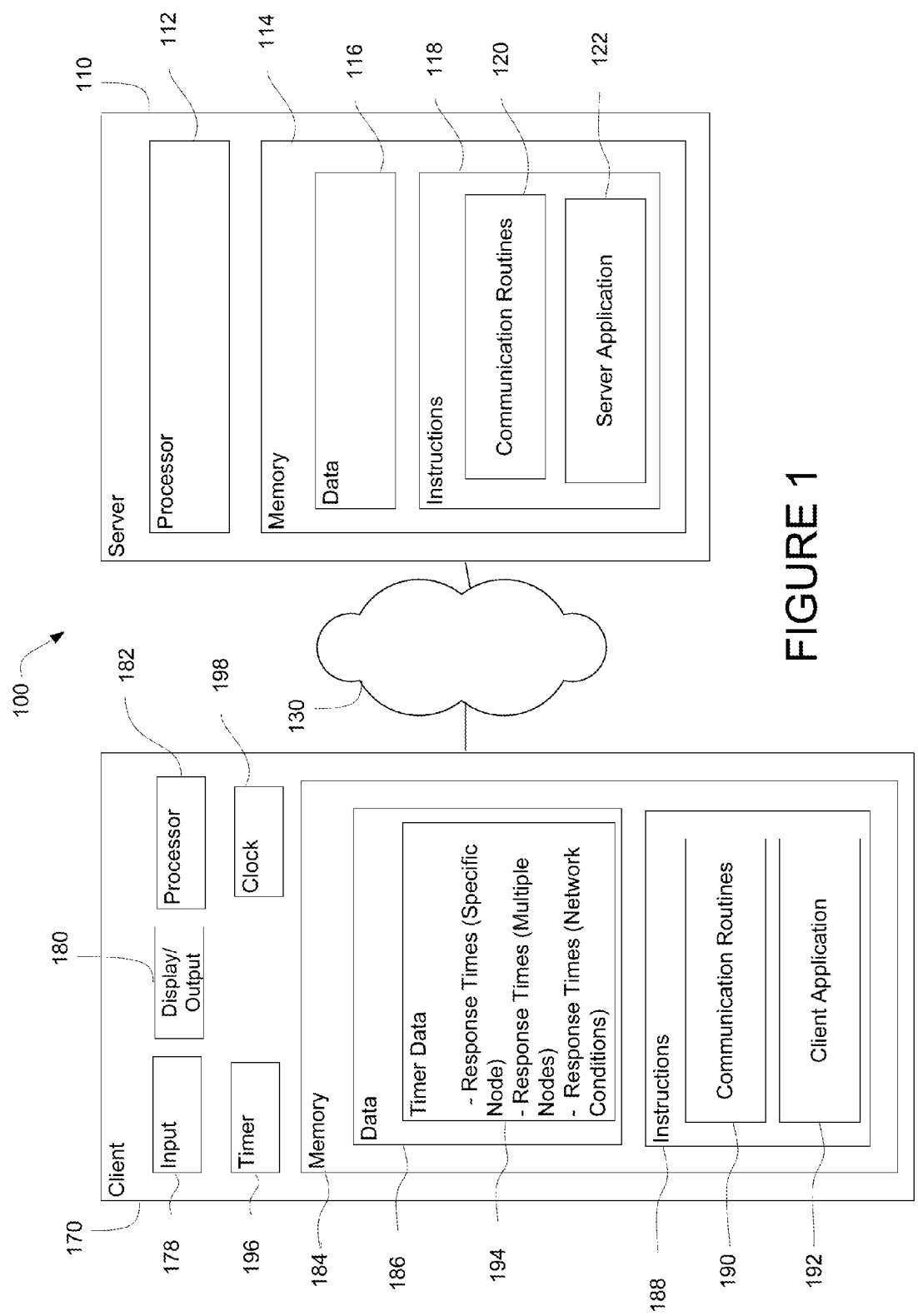
FIG. 1 is a block diagram of an exemplary embodiment of the system of FIG. 2.
Figure 2:
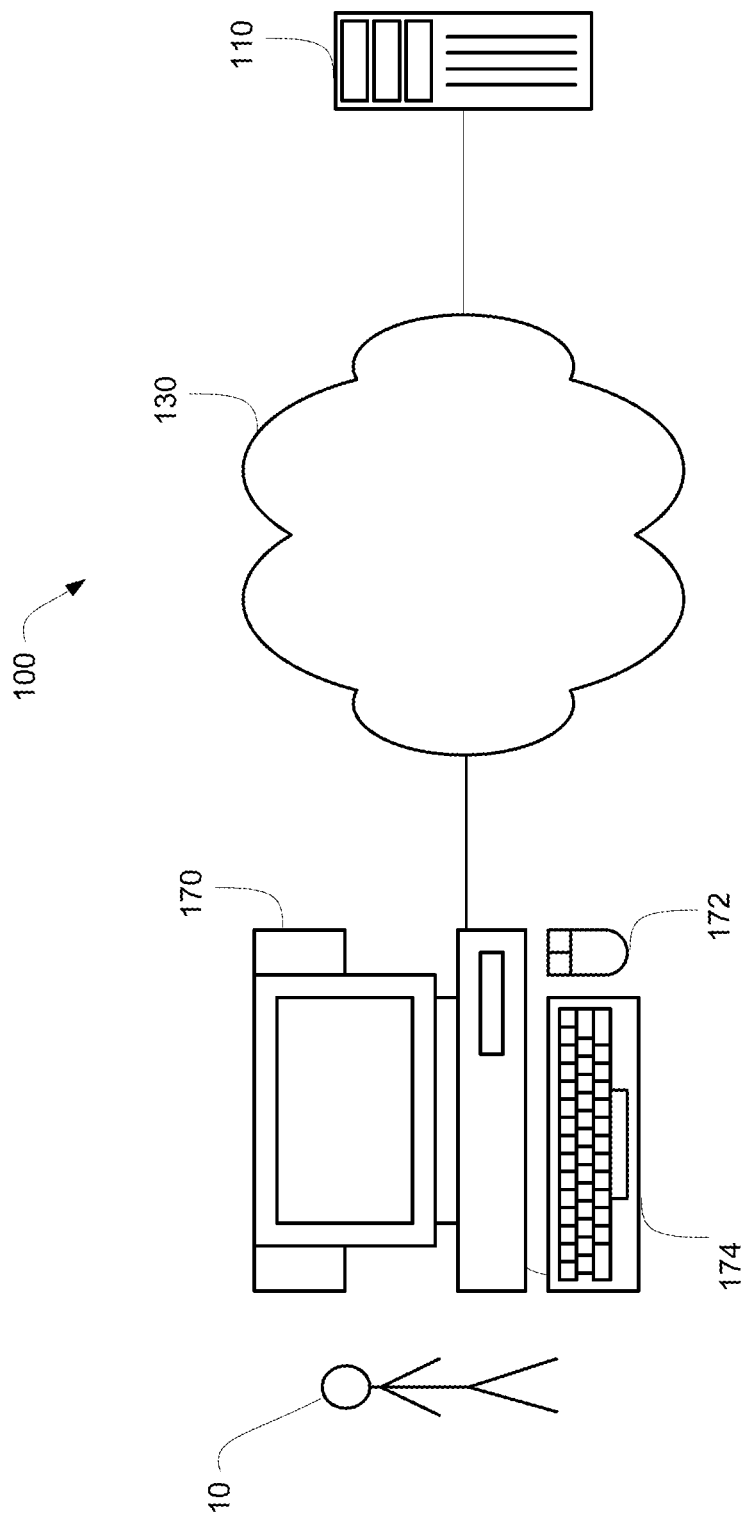
FIG. 2 is a block diagram of a system in accordance with an aspect of the present invention.

Referring to FIGS. 1-2, a communication system 100 in accordance with one aspect of the invention may provide for exchange of data between a client computer 170 and a server computer 110 over a communication network 130. The client computer 170 contains a processor 182, memory 184 and other components typically present in general purpose computers. In addition, the server 110 contains a processor 112 and a memory 114.

The memory 184 stores information accessible by the processor 182, including instructions 188 that may be executed by the processor 182 and data 186 that may be retrieved, manipulated or stored by the processor 182. Similarly, the memory 114 stores information accessible by processor 112, including instructions 118 that may be executed by the processor 112 and data 116 that may be retrieved, manipulated or stored by the processor 112. The memory may be of any type capable of storing information accessible by the processor, including a computer medium such as a hard-drive, memory card, ROM, RAM, DVD, CD-ROM, write-capable, and read-only memories.

The processors 112, 182 may comprise any number of well known processors, such as processors from Intel Corporation. Alternatively, the processors may be a dedicated controller such as an ASIC.

The instructions 118, 188 may comprise any set of instructions to be executed directly (such as machine code) or indirectly (such as scripts) by the processors 20, 70, respectively.

In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 116, 186 may be retrieved, stored or modified by the processors 112, 182 in accordance with the instructions 118, 188, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, the client computer 170 may be a general purpose computer, intended for use by a person, having all the internal components normally found in a personal computer such as a central processing unit (CPU), display 180, input 178 such as a CD-ROM drive, mouse, keyboard or microphone, and a hard-drive, speakers, modem and/or router (telephone, cable or otherwise) and all of the components used for connecting these elements to one another. Moreover, computers 110, 170 in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 2 are the mouse 172 and keyboard 174, other means for inputting information from a human into a computer are also acceptable such as a microphone, touch-sensitive screen, voice recognition, position or orientation sensitive devices including accelerometers, etc.

The server 110 and the client computer 170 are capable of direct and indirect communication, such as over the network 130. Although only a single client computer and a single server are depicted in FIGS. 1 and 2, it should be appreciated that a typical system can include a large number of connected computers and several servers (e.g., web-servers, Domain Name Servers, routers) to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, TCP/IP, UDP, Ethernet, WiFi and HTTP. Such communication may be facilitated by any device capable of transmitting data to and from other computers, such as modems (e.g., dial-up or cable), networks cards and wireless interfaces.

Instructions 188 in client 170 may include a client application 192 and communication routines 190. The client application 192 may be any software or program running on the client device. For example, the client application may be a web-browser application running on the client device that is capable of communicating with server 110 over network 130.

The communication routines 190 may be any software or routines that assist in the receipt and transmission of the information from the client device to the server device over the network. In this regard, the communication routines 190 may be capable of receiving and transmitting information over network 130 in accordance with one or more networking protocols, such as the networking protocols that are provided as part of the TCP/IP protocol suite.

The client application 192, such as a web-browser application, may use the communication routines 190 to communicate with server 110 over network 130. For example, a web-browser application running on the client may request a TCP connection to the web-server using the communication routines 190. The communication routines 190 may transmit the connection request to the server by packetizing the connection request into one or more data packets (e.g., SYN packet) in accordance with the TCP/IP protocol.

The communication routines 190 may also receive information from the server over the network. For example, the communication routines 190 may receive the data packets from the server 110 responsive to the connection request, and provide the response contained in the data packets to the web-browser application. Once a connection between the client and the server device is established, the web-browser application may use the communication routines to communicate with the server over the connection using one or more network protocols.

Data 186 in the client computer 170 may include any data. For example, data 186 may include data to be transmitted to the server or data received from the server. The data received from the server may include, for example, data responsive to a connection request transmitted to the server in accordance with a network protocol, or may include any other data received from the server over the network. The data to be transmitted to the server may include, for example, a connection request to the server in accordance with a network protocol, or any other data to be transmitted from the client to the server over the network.

Additionally, data 186 may include timer data 194, which may be used to adaptively determine a dynamic initial value of one or more timers 196. For example, the timer data 194 may include response time data collected in connection with historical requests that were transmitted from the client device 170 over the network 130. In this regard, the timer data 194 may include response time data based upon prior responses received at the client device from a specific node or server in response to the historical requests transmitted from the client to that server. Alternatively or in addition, timer data 194 may include response time data based upon prior responses received at the client device from multiple servers or nodes over the network, and may also include response time data based upon network conditions determined by measuring or calculating network parameters such as, but not limited to, the Round Trip Time (RTT) of the network.

Timer 196 may be a programmable timer implemented in hardware, software, or a combination of both. In this regard, timer 196 may be driven by the system clock 198, and may be either a count-up or a count-down timer. Timer 196 may be programmable by any application running on client 170, such as the client application 192, which may initialize, start, and stop the timer. Timer 196 may be initialized with a threshold value, and may either count up to or down from the threshold value. Timer 196 may be programmed to indicate to the client application, using hardware or software interrupts, that the threshold time has been reached and that the timer has expired. Alternatively, client application 192 may poll the timer 196 to determine the amount of time that has elapsed (or is remaining) since the start of the timer.

Instructions 118 in server 110 may include a server application 122 and communication routines 120. The server application may be any program or software, such as, for example, a web-server application that is capable of communicating with the client 170 over network 130.

The communication routines 120 may be any software or routines that assist in the receipt and transmission of the information from the server device to the client device over the network. In this regard, the communication routines 120 may be capable of receiving and transmitting information over network 130 in accordance with one or more networking protocols, such as the networking protocols that are provided as part of the TCP/IP protocol suite.

The server application 122, such as the web-server application, may use the communication routines 120 to communicate with client 170 over network 130. For example, the web-server application running on the server may receive a request for a TCP connection from the client device via the communication routines 120. In this regard, the communication routines 120 may receive the one or more data packets from the client containing a request for a TCP connection in accordance with the TCP/IP protocol, and may provide the request contained in the data packets to the web-server application.

The communication routines 120 may also transmit information from the server to the client over the network. For example, a server application 122 such as a web-server application may transmit information using the communication routines to the client acknowledging that a connection has been granted in response to the connection request. Once the connection between the server and the client is established, the web-server application may use the communication routines to communicate with the client over the connection using one or more network protocols.

Data 116 in the server 110 may include any data, such as, for example, data to be transmitted to the client and data received from the client. The data to be transmitted to the client may include, for example, data responsive to a connection request received from the client in accordance with a network protocol, and may include any other data to be transmitted over the network. The data received from the client may include, for example, a request from the client in accordance with a network protocol, or any other data received from the client over the network.

Figure 8:
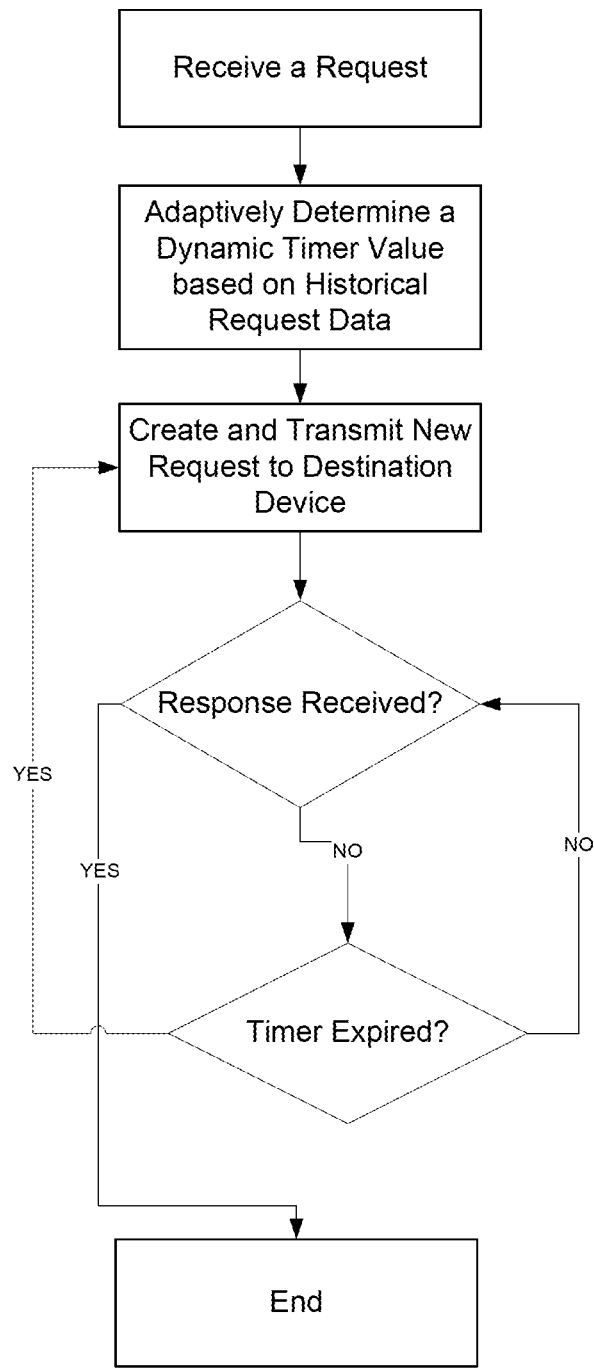
FIG. 8 illustrate a flow diagram of a process in accordance with various aspects of the present invention.

An exemplary operation in accordance with the process shown in FIG. 8 and various aspects of the invention follows below. It should be understood that the following operations do not have to be performed in the precise order described below. Rather, various steps can be handled in reverse order or simultaneously.

Figure 3:
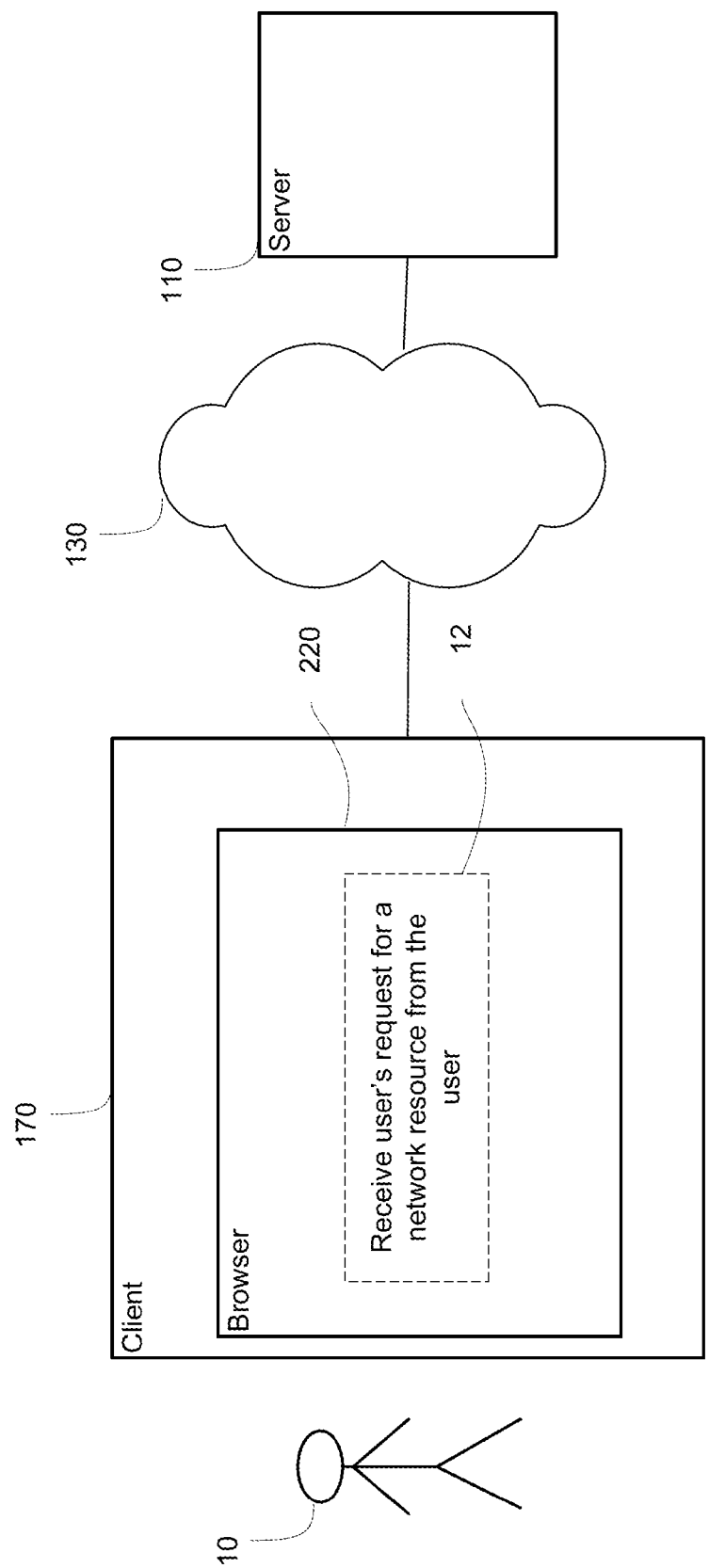
FIGS. 3-7 illustrate an exemplary operation in accordance with one aspect of the present invention.

As shown in FIG. 3, an application running on the client 170, such as the web-browser application 220, may receive a user request 12 from a user. For example, a user 10 of the client device 170 may use inputs 172, 174 to enter the web-address or URL of a desired web site (e.g., www.xyz.com) hosted by server 110 into the web-browser application 220.

Figure 4:
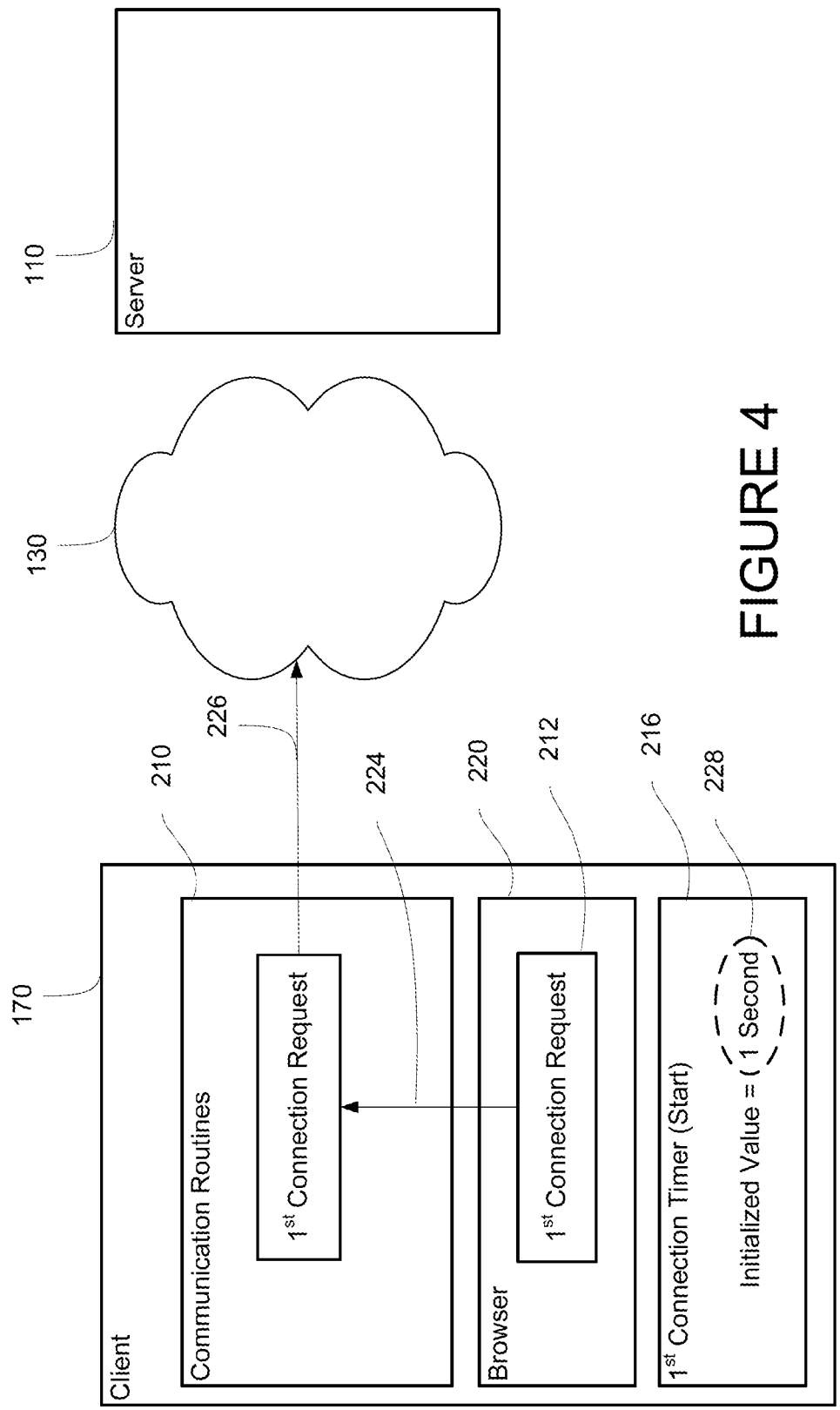

As shown in FIG. 4, the web-browser application 220 may determine that the desired web site is hosted by server 110 and may generate an original $1^{st}$ connection request 212 requesting a connection to server 110. As shown by line 224, the web-browser application 220 may pass the $1^{st}$ connection request 212 to the communication routines 210 for transmission to the server using an appropriate interface. As shown by the line 226, the communication routines 210 may receive the $1^{st}$ connection request 212 from the web-browser application and, in turn, may packetize and transmit the connection request 212 over the network in accordance with one or more network protocols. In one aspect, the $1^{st}$ connection request 212 may be a request for a TCP connection between the client and the server, and the communication routines 210 may transmit a SYN packet over the network 130 to the server 110 in accordance with the TCP/IP protocol.

In addition to generating and transmitting the original $1^{st}$ connection request 212, the web-browser application 220 may also concomitantly initialize and maintain a $1^{st}$ connection timer 216. The $1^{st}$ connection timer 216 may be initially set to an adaptively determined dynamic period of time 228 that the web-browser application will wait for the server's response prior to transmitting a new request.

In one aspect, the dynamic initial value of timer 216 may be adaptively determined based on analyzing data that includes information with respect to the time interval after which responses were received from a specific target node (e.g. server 110) to historical connection requests. For example, the web-browser application 220 may store data specific to server 110 that includes the periods of time within which responses were received from the server 110 in response to historical connection requests (i.e., non-pending, closed requests) to the server. The web-browser application may analyze the stored data and adaptively determine that the majority of the responses from server 110 to a historical connection requests were received within, for example, one (1) second of transmitting the historical connection requests to the server. In some embodiments, the analysis may be used to identify a dynamic time interval after which a vast majority (such as 75%; or 95%; etc.) of previous responses from server 110 were received to historical requests. Based on such analysis, the web-browser application may generate the $1^{st}$ connection request 212 to the server 110 and concomitantly initialize and start the timer 216 with the exemplary dynamic initial value of one (1) second as indicated by the dashed circle 228 in FIG. 4.

Figure 5:
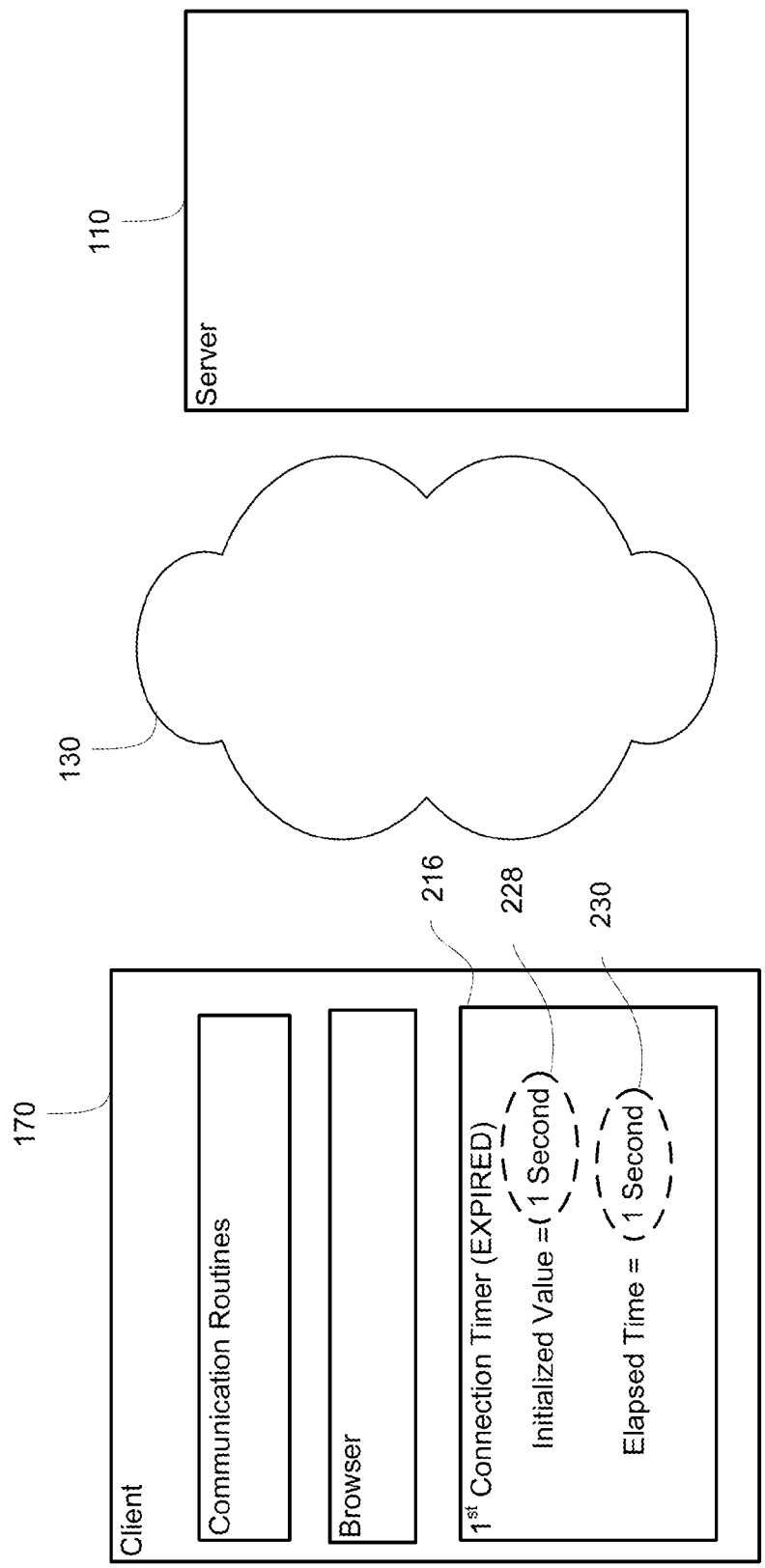

Upon expiration of the $1^{st}$ connection timer 216 and in the absence of a response from server 110, the web-browser application 220 may determine that the $1^{st}$ connection request 212 to server 110 has been lost in transmission. As shown in FIG. 5 for example, the web-browser application may compare the time that has elapsed (shown as dashed circle 230) since the start of the timer 216 with the dynamic starting value 228 of the timer to determine whether the elapsed time is equal to or greater than the starting value. As illustrated in FIG. 5, the web-browser application may determine that the timer 216 has expired since the elapsed time 230 is equal to the dynamic starting value 228.

Figure 6:
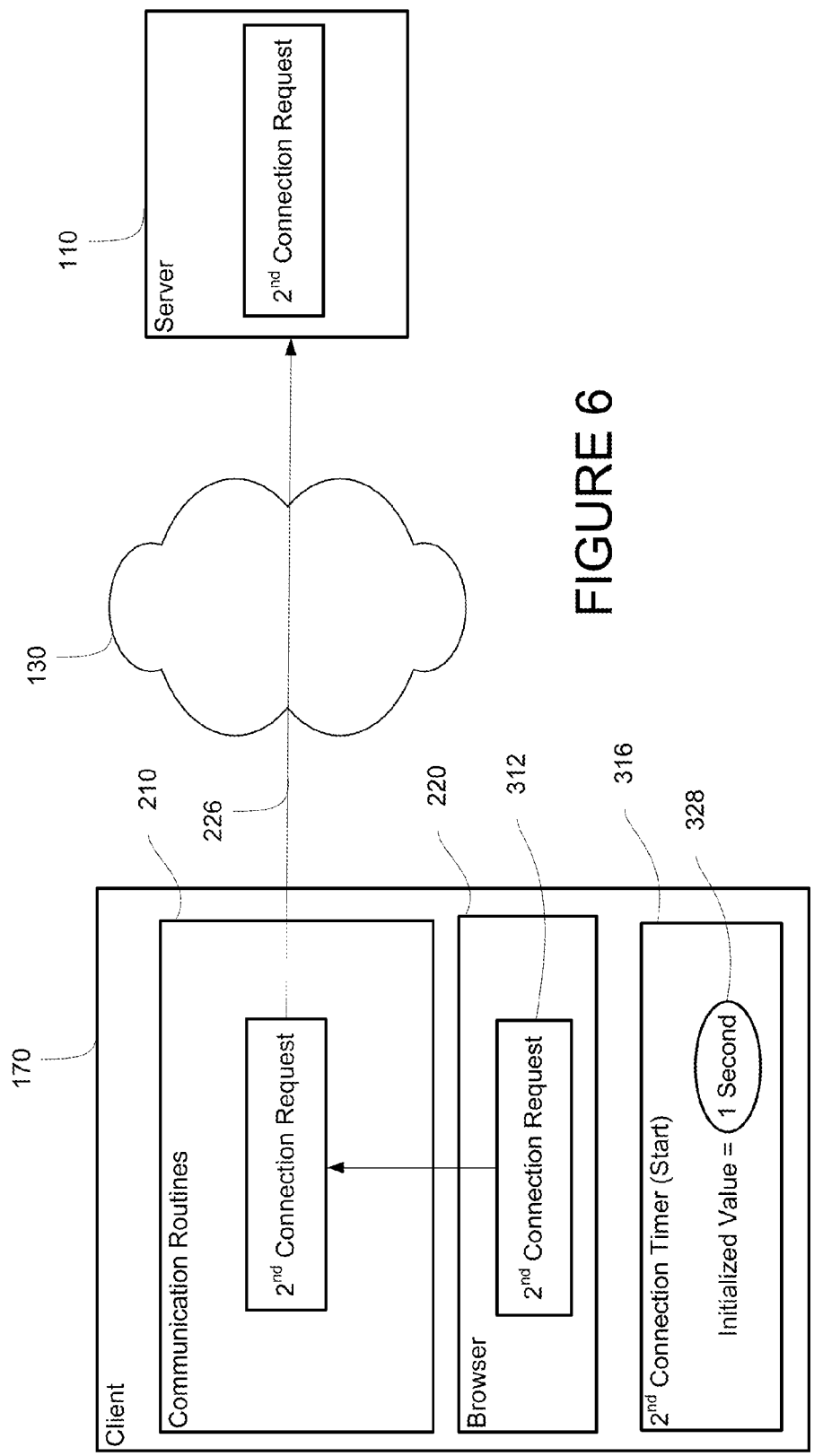

As shown in FIG. 6, upon a determination that the $1^{st}$ connection timer has expired prior to receiving a response to the $1^{st}$ connection request, the web-browser application 220 may generate and transmit a brand new second connection request 312 that is distinct from unrelated to the still pending and active $1^{st}$ connection request 212, to the server 110 while concomitantly starting a $2^{nd}$ connection timer 316 that is also initialized to a dynamic initial value 328 determined adaptively as described herein.

Figure 7:
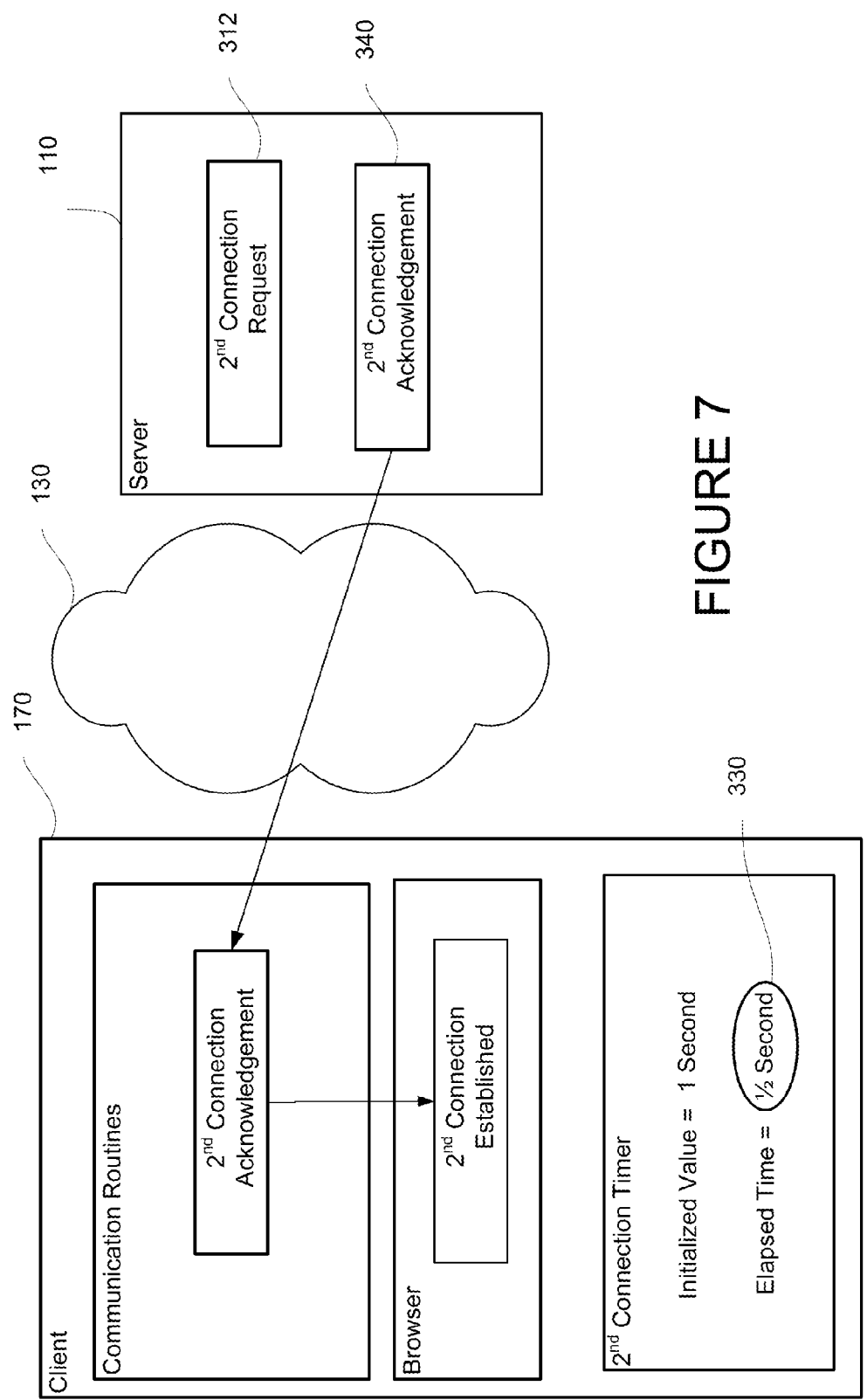

As further shown in FIG. 6, the server 110 may receive the $2^{nd}$ connection request 312 transmitted by the client prior to receiving the still pending $1^{st}$ connection request 212, which may be delayed or lost en route to the server. As shown in FIG. 7, the server 110 may, in response to receiving the $2^{nd}$ connection request 312, generate and transmit a response 340 (e.g., SYN-ACK packet) back to the client 170 acknowledging that the $2^{nd}$ connection request has been granted. Upon receiving and acknowledging the response 340 from the server, the communication routines 290 may pass the connection information to the web-browser application 220. The web-browser application may then transmit and receive data over the network using the established connection to the server.

The dynamic starting timeout values of the connection timers 216, 316, may be adaptively determined in several ways. As described above, in one aspect the dynamic starting values of timers 216 and 316 may be adaptively determined based on analyzing the response time data collected in connection with other (e.g., historical) connection requests transmitted to a specific network node (e.g., server 110). The starting timer values may thus be chosen by analyzing the response time data and determining the average response time for all historical transmitted connection requests, the previous response time for a majority of historical transmitted connection requests, the previous response time for a vast majority of historical transmitted requests, or even the previous response time for the most recent historical request transmitted to the server.

Alternatively, in another aspect the dynamic starting values of timers 216 and 316 may be adaptively determined based on analyzing the response time data collected in connection with historical connection requests transmitted to several nodes (e.g., multiple servers). For example, the client device may maintain and analyze response time data for all historical requests transmitted by the client to multiple servers over the network. In this regard, the dynamic starting values of the timers may be determined based on an average or typical response time calculated from the response times of all the servers, a majority of the servers, a vast majority of the servers, or even a server that is different from the server to which a new connection request is to be transmitted. Further in this regard, the client device may store a running average of typical response times in connection with the historical requests transmitted to various servers over a period of time, and use the running average as the dynamic starting value for the timers 216 and 316.

In a yet another aspect, the dynamic starting values of timers 216 and 316 may be determined based on the Round Trip Time, commonly known as the RTT, of the network when historical connection requests were transmitted, or based upon the RTT associated with other contemporaneous and unrelated connection requests transmitted by the client. The RTT may be specific to the server 110, or may be an average RTT based on general current network conditions. The client device may then adaptively determine the dynamic starting values for timers 216 and 316 based on the RTT, and operate as described above.

Moreover, the dynamic starting value may be determined based on various combinations of the foregoing. For example, when adaptively setting the timer for a specific website, the client device may calculate a value based on the average RTT to the server hosting the specific website, the RTT as measured for a contemporaneous (but separate and unrelated) connection request, the previous RTT to the server hosting the specific website, the (contemporaneous and/or historical) average RTT to other nodes, the previous response time of another node, a fixed value representing the maximum starting timer value, and a fixed value representing the minimum starting timer value.

The aspects of the invention disclosed herein have the advantage of being flexible enough to accommodate a variety of alternatives.

For example, the maintenance of timers that are originally initialized to adaptively determined dynamic values and the transmission of new requests from the client to the server in accordance with various aspects disclosed herein may be performed at the application layer by any application or program running on the client, and distinct from the functionality provided by conventional non-application or lower layers of network protocols (e.g., the TCP, UDP, or IP layers) that initially set a retransmission timer to a static and fixed value.

Additionally, the system and method may also be used with client devices that implement and operate in accordance with networking protocols such as the TCP/IP protocol suite.

While certain networking protocols such as the TCP/IP protocol suite maintain and use timers to retransmit an original connection request, typical implementations of such protocols may greatly increase latency (measured from a user's perspective) because the timers are initially set to a static and fixed default value which in some cases is as large as several seconds. For example, the typical static timer value after which an original connection request may be retransmitted in accordance with the conventional implementation of the TCP/IP is 3 seconds as specified by the current RFC. In addition, conventional networking protocols do not transmit a new request that is separate and distinct from the original request when the static timer value expires. Rather, conventional protocols simply retransmit the same original request, and again wait for a response to the original request.

By adaptively maintaining one or more timers that are initially set to an adaptively determined dynamic value and are distinct from those maintained by conventional networking protocols, and by transmitting a new connection request that is distinct from and unrelated to the still pending original request may significantly reduce latency for certain requests (e.g., connection requests) because the adaptively determined dynamic timer values may often be much smaller than the static and fixed initial values typically used by conventional implementations of the network protocols.

Thus, by implementing a more efficient method of transmitting information over the network using adaptively determined initial timeout periods as described herein, various aspects of the present invention may greatly reduce the amount of latency experienced in certain transmissions such as connection requests, which may ultimately result in a connection being established relatively much earlier than it would have been otherwise.

Another advantage of transmitting a brand new connection request upon expiration of an initial and dynamic timer value is that in some circumstances an application running on a client device may be able to request additional resources sooner. For example, in some circumstances the web-server 110 may eventually receive and grant the still pending and delayed $1^{st}$ connection request after the $2^{nd}$ connection has already been established between the client device and the server device as described above. In such circumstances, the web-browser application 220 may then advantageously use both the $1^{st}$ and the $2^{nd}$ established connections to request additional resources (e.g., images or data in a web-page) from the server device without having to request additional connections to the server.

Further still, the various aspects of the invention exemplarily described herein are not limited to any particular client, server, network protocol, or type of request. For example, different types of requests may be transmitted by any device over the network in conjunction with adaptively determined dynamic timer values as described herein to any other device capable of servicing the request.

In this regard, a client or sending device may transmit user datagram packets (UDP) in accordance with the UDP protocol, where the UDP packets contain a domain name resolution request directed to a Domain Name Server (DNS) for resolving a web-address or URL into an IP address of a server or receiving device. As before, the client device may maintain an adaptive and dynamic timer for the DNS request as described hereinabove that may be distinct from timers implemented by communication routines in accordance with conventional networking protocols. If a response to the DNS request is not received from the DNS server prior to the expiry of the adaptive timer, the client device may send a new DNS request that is unrelated to any original and pending DNS request to the DNS server in the manner described fully above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting packets over a network, the method comprising:
  adaptively determining, by a processor of a first device, a dynamic initial timeout value for a request to be sent over a network, the dynamic initial timeout value being adaptively determined based on a time within which a previous response was received at the first device from another device on the network in response to a historical request;
  transmitting a data packet including a first request for first information from the first device to a second device over the network;
  before a response is received from the second device to the first request, the processor determining whether the adaptively determined dynamic initial timeout value is exceeded to determine whether to transmit a new request for the first information to the second device, where the new request is distinct from and unrelated to the first request.

2. The method of claim 1, wherein when it is determined that the adaptively determined dynamic initial timeout value is exceeded, transmitting another data packet containing the new request.

3. The method of claim 1, wherein the dynamic initial timeout value is adaptively determined based on the time within which a majority of previous responses were received at the first device over the network in response to historical requests.

4. The method of claim 1, wherein the dynamic initial timeout value is adaptively determined based on the time within which a previous response was received at the first device in response to the most recent historical request.

5. The method of claim 1, wherein the dynamic initial timeout value is adaptively determined based on an average response time for a set of historical requests.

6. A system comprising:
  a memory storing instructions and data, the data comprising a first request for first information to be provided over a network to a second device; and
  a processor coupled to the memory, the processor being configured to execute the instructions and to process the data to:
  adaptively determining a dynamic initial timeout value for a request to be sent over a network, the dynamic initial timeout value being adaptively determined based on a time within which a previous response was received at the first device from another device on the network in response to a historical request;
  transmit a data packet including the first request for the first information from the first device to the second device over the network;
  before a response is received from the second device to the first request, determining whether the adaptively determined dynamic initial timeout value is exceeded to determine whether to transmit a new request for the first information to the second device, where the new request is distinct from and unrelated to the first request.

7. The system of claim 6, wherein when it is determined that the adaptively determined dynamic initial timeout value is exceeded, the processor is configured to transmit another data packet containing the new request.

8. The system of claim 6, wherein the dynamic initial timeout value is based on the time within which a majority of previous responses were received at the first device over the network.

9. The system of claim 6, wherein the dynamic initial timeout value is based on the time within which a previous response was received at the first device in response to the most recent historical request.

10. The system of claim 6, wherein the dynamic initial timeout value is adaptively determined based on an average response time for a set of historical requests.

11. A method of transmitting packets over a network, the method comprising:
  receiving, at a first device, a request for first information;
  generating a first connection request to a second device on the network based on the request for the first information;
  transmitting the first connection request to the second device via the network;
  concomitant with the generating and transmitting the first connection request, starting, by a processor of a first device, a first connection timer that is set to an adaptively determined dynamic time period that the first device will wait for a response from the second device, the adaptively determined dynamic time period being based on historical connection requests by the first device; and
  while the first connection request is still pending and active, upon expiration of the first connection timer and in absence of a response from the second device:
  generating a new connection request to the second device based on the request for the first information, the new connection request being distinct from and unrelated to the still pending and active first connection request,
  transmitting the new connection request to the second device via the network, and
  concomitant with the generating and transmitting the new connection request, starting, by the processor, a second connection timer that is set to a second adaptively determined dynamic time period that the first device will wait for the response from the second device, the second adaptively determined dynamic time period being based on the same or different historical connection requests used to set the first adaptively determined dynamic time period.

12. The method of claim 11, wherein the adaptively determined dynamic time period for one or both of the first and second connection timers is based on analyzing response time data collected in connection with historical connection requests transmitted to a specific node of the network.

13. The method of claim 11, wherein the adaptively determined dynamic time period for one or both of the first and second connection timers is based on an average response time for a set of historical connection requests transmitted by the first device.

14. The method of claim 11, wherein the adaptively determined dynamic time period for one or both of the first and second connection timers is based on a previous response time for a majority of historical transmitted connection requests.

15. The method of claim 11, wherein the adaptively determined dynamic time period for one or both of the first and second connection timers is based on a previous response time for a most recent transmitted historical request.

16. A system comprising:
a memory storing instructions and data; and
a processor coupled to the memory, the processor being configured to execute the instructions and to process the data to:
receive, at a first device, a request for first information;
generate a first connection request to a second device on a network based on the request for the first information;
transmit the first connection request to the second device via the network;
concomitant with the generating and transmitting the first connection request, start a first connection timer that is set to an adaptively determined dynamic time period that the first device will wait for a response from the second device, the adaptively determined dynamic time period being based on historical connection requests by the first device; and
while the first connection request is still pending and active, upon expiration of the first connection timer and in absence of a response from the second device:
generate a new connection request to the second device based on the request for the first information, the new connection request being distinct from and unrelated to the still pending and active first connection request,
transmit the new connection request to the second device via the network, and
concomitant with the generating and transmitting the new connection request, start a second connection timer that is set to a second adaptively determined dynamic time period that the first device will wait for the response from the second device, the second adaptively determined dynamic time period being based on the same or different historical connection requests used to set the first adaptively determined dynamic time period.

17. The system of claim 16, wherein the adaptively determined dynamic time period for one or both of the first and second connection timers is based on analyzing response time data collected in connection with historical connection requests transmitted to a specific node of the network.

18. The system of claim 16, wherein the adaptively determined dynamic time period for one or both of the first and second connection timers is based on an average response time for a set of historical connection requests transmitted by the first device.

19. The system of claim 16, wherein the adaptively determined dynamic time period for one or both of the first and second connection timers is based on a previous response time for a majority of historical transmitted connection requests.

20. The system of claim 16, wherein the adaptively determined dynamic time period for one or both of the first and second connection timers is based on a previous response time for a most recent transmitted historical request.

* * * * *